United States Patent
Girouard et al.

(10) Patent No.: US 7,360,095 B2
(45) Date of Patent: Apr. 15, 2008

(54) METHOD AND APPARATUS FOR A PROXIMITY WARNING SYSTEM

(75) Inventors: Janice Marie Girouard, Austin, TX (US); Mark Joseph Hamzy, Round Rock, TX (US); Emily Jane Ratliff, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 788 days.

(21) Appl. No.: 10/443,698

(22) Filed: May 22, 2003

(65) Prior Publication Data

US 2004/0236952 A1 Nov. 25, 2004

(51) Int. Cl.
*H04K 1/00* (2006.01)

(52) U.S. Cl. ............ 713/182; 715/741; 715/742; 715/743; 726/2; 726/3; 726/4; 726/21; 726/22; 726/17; 726/34; 726/20; 340/505; 340/568.2; 709/224

(58) Field of Classification Search .......... 713/182; 715/741, 742, 743; 726/2, 3, 4, 17, 20, 21, 726/22, 34; 340/505, 568.2; 709/224
See application file for complete search history.

(56) References Cited

U.S. PATENT DOCUMENTS

| | | | | |
|---|---|---|---|---|
| 5,682,142 A | * | 10/1997 | Loosmore et al. | 340/572.1 |
| 5,701,342 A | * | 12/1997 | Anderson et al. | 713/176 |
| 5,886,634 A | * | 3/1999 | Muhme | 340/572.1 |
| 6,002,427 A | * | 12/1999 | Kipust | 348/156 |
| 6,275,824 B1 | * | 8/2001 | O'Flaherty et al. | 707/9 |
| 6,344,794 B1 | * | 2/2002 | Ulrich et al. | 340/539.16 |
| 6,373,389 B1 | * | 4/2002 | Przygoda et al. | 340/572.4 |
| 6,433,689 B1 | * | 8/2002 | Hovind et al. | 340/573.1 |
| 7,010,681 B1 | * | 3/2006 | Fletcher et al. | 713/154 |
| 2003/0196108 A1 | * | 10/2003 | Kung | 713/200 |

OTHER PUBLICATIONS

Software House, "Access Control and Advanced Event Manager", C Cure 800 www.swhouse.com, pp. 1-4, Feb. 1, 2003.

* cited by examiner

*Primary Examiner*—Kim Vu
*Assistant Examiner*—April Y. Shan
(74) *Attorney, Agent, or Firm*—Duke W. Yee; Matthew W. Baca; Mari A. Stewart (57) ABSTRACT

The present invention provides a method, apparatus, and computer instructions for warning of a presence of a person in a zone having an inadequate security clearance. Movement of the person in the zone is detected. A message is broadcast to selected data processing systems associated with the zone, wherein the data processing systems initiate actions to protect data in the selected data processing systems.

7 Claims, 6 Drawing Sheets

```
//assume lower levels are lesser security
<security level="1"> ⟵ 1404
<table cellpadding=4 cellspacing=0 border=0 width=100%>
<tr><td valign=top width=20%><span class=greenhead>The Quarter </span></td>
<td valign=top width=13%><img src="images/stories/blocks.gif" border=0 width=50 height=34></td>
<td>
<security level="8"> ⟵ 1400
<a href="http://w3.ibm.com/articles/scorecard/2003/1q/performpay/index.html" class=noline><span class=subtitle25>Scorecard: Performance & Pay</span></a><br />
</security>        // end of security level 8 ⟵ 1402
<table cellpadding="0" cellspacing="0" border="0" width="100%">
<tr><td height=2><img src="http://w3.ibm.com/images/v6/odot.gif" width="2" height="1" border="0"></td></tr></table>
<table cellpadding=0 cellspacing=0 border=0 width=100%>
<tr><td background="http://w3.ibm.com/images/v6/back_dots_66f.gif"><img src="http://w3.ibm.com/images/v6/odot.gif" width="2" height="1" border="0" /></td></tr></table>
</security>        // end of security level 1 (they are nested) ⟵ 1406
```

FIG. 14

METHOD AND APPARATUS FOR A PROXIMITY WARNING SYSTEM

BACKGROUND OF THE INVENTION

1. Technical Field

The present invention relates to an improved data processing system and in particular, a method, apparatus, and computer instructions for processing data. Still more particularly, the present invention provides an improved method, apparatus, and computer instructions for generating notifications in a proximity warning system.

2. Description of Related Art

Many types of proximity warning systems are used in many environments. For example, in highly secure research environments, such as a government laboratory, a warning system is used to alert others when a guest is escorted into a laboratory. Typically, warning lights are activated with an optional sound component. Personnel within the laboratory are expected to protect confidential material until the guest has left the laboratory. One drawback to this type of warning system is that the warning system must be manually activated and deactivated. Further, personnel in the laboratory are expected to take action to protect confidential materials, such as those displayed on computer displays.

In some cases, the alert is generated in response to a guest swiping a badge to enter a laboratory. In this type of environment, electronic access control is enforced through access decisions responsive to the user swiping a badge in a card reader when entering the laboratory. This kind of system, however, requires all guests to swipe their badges. Generally, guests are unable to enter an area without an escort. Only the escort's badge allows access. As a result, the escort must ensure that the guest also swipes the guest badge to ensure that the alert is generated, such as flashing lights within the secured area.

Both systems require action on the part of the escort, as well as action on the part of those personnel in the secure area. Therefore, it would be advantageous to have an improved method, apparatus, and computer instructions for generating alerts when a guest or other person having inadequate security clearance enters a secure area.

SUMMARY OF THE INVENTION

The present invention provides a method, apparatus, and computer instructions for warning of a presence of a person in a zone having an inadequate security clearance. Movement of the person in the zone is detected. A message is broadcast to selected data processing systems associated with the zone, wherein the data processing systems initiate actions to protect data in the selected data processing systems.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
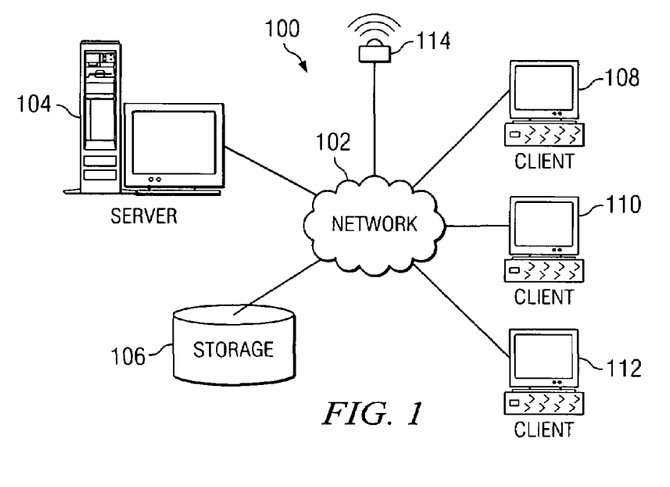
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

Sensor 114 also is present in network data processing system 100. Sensor may take many forms depending on the implementation. In these examples, sensor 114 is used in conjunction with processes to generate alerts for a zone or area when a person with in adequate security enters that zone. The sensor detects the entry or movement of the person into the zone by a tag on the person. For example, the tag may be integrated into a guest or employee badge worn by the person.

In the depicted example, network data processing system 100 is a local area network. Clients 108, 110, and 112 may be located in the zone, along with sensor 114, which monitors for tags worn by personnel or guests. Server 104 includes the processes used to receive alerts from sensor 114 and broadcasts appropriate messages to the clients through wired or wireless communications links in network 102. Server 104 may be connected directly to sensor 114 or may be in a remote location in communication with sensor 114. Network data processing system 100 also may be implemented as a number of different types of networks, such as for example, an intranet or a wide area network (WAN). FIG. 1 is intended as an example, and not as an architectural limitation for the present invention.

Figure 2:
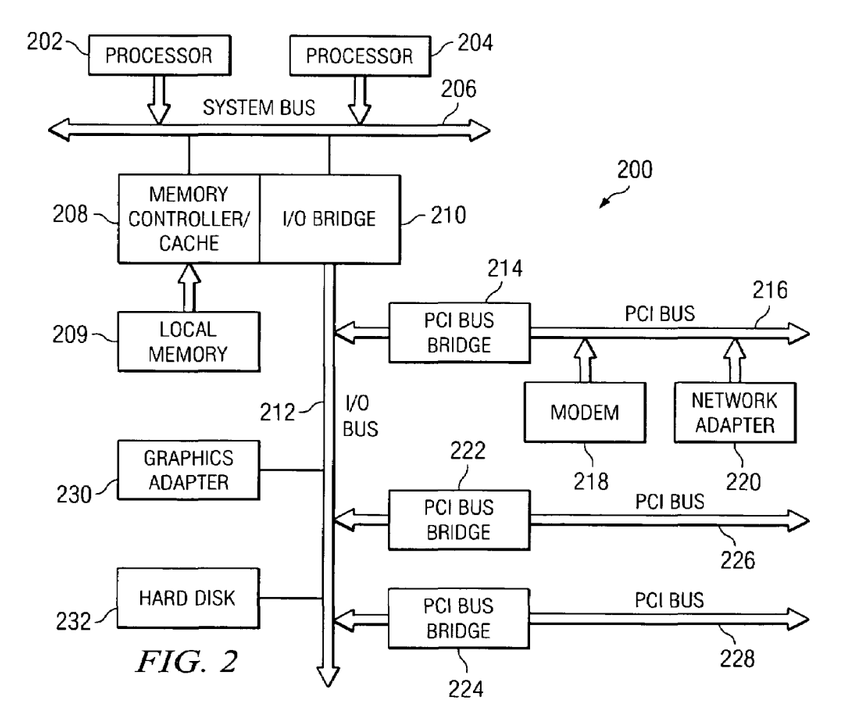
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
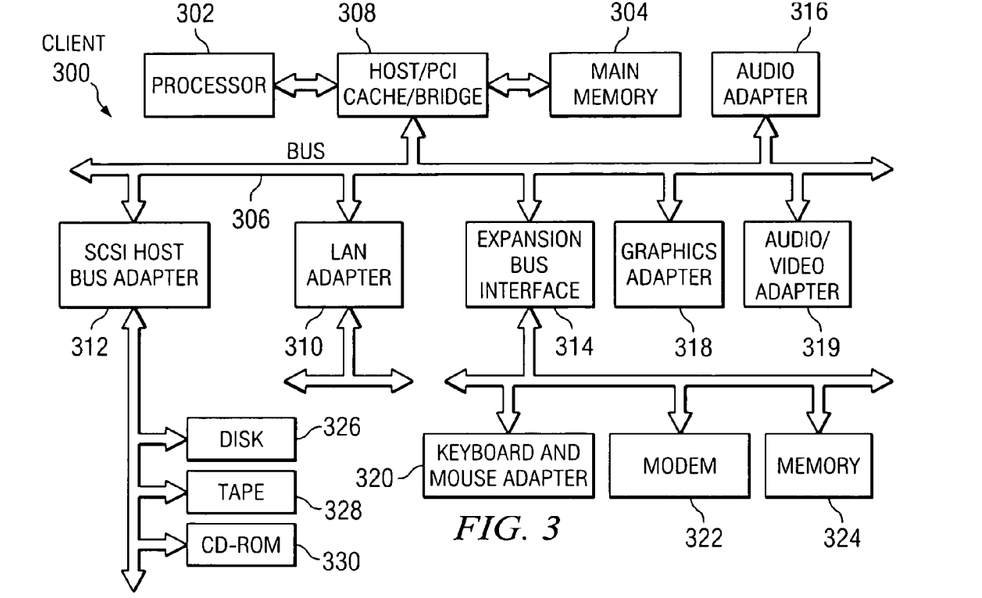
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330.

An operating system runs on processor 302 and is used to coordinate and provide control of various components within data processing system 300 in FIG. 3. The operating system may be a commercially available operating system, such as Windows XP, which is available from Microsoft Corporation. Instructions for the operating system and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides an improved method, apparatus, and computer instructions for automatically detecting guests or personnel with inadequate security clearance in a zone or area and warning users and taking other security actions when such persons are entering the secured area or zone. The mechanism of the present invention broadcasts messages to data processing systems within the zone when a sensor detects a guest or personnel with inadequate security clearance entering the zone. The different data processing systems within the zone perform security actions depending on the sensitivity or confidentiality level of information presently being displayed or made available at the data processing systems.

Figure 4:
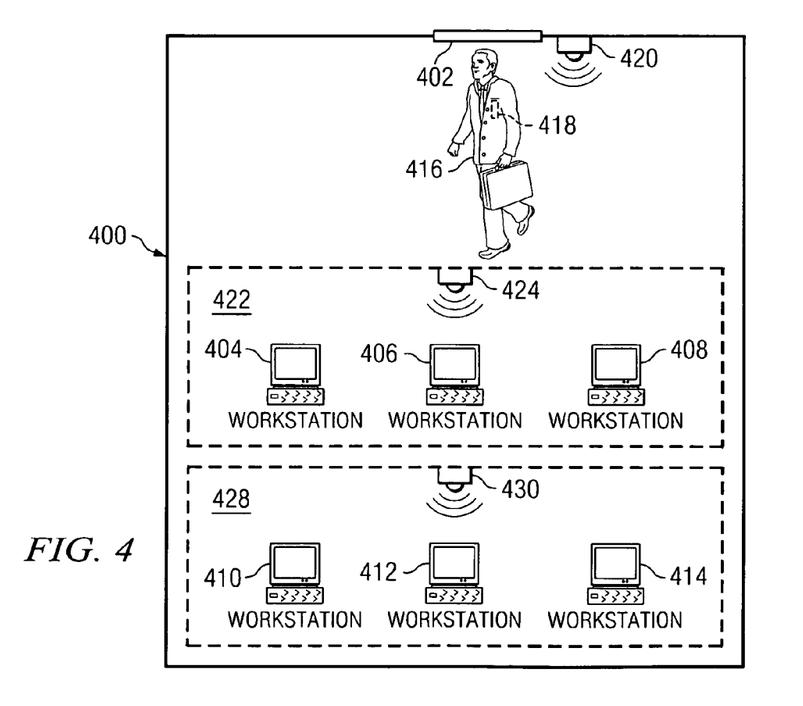
FIG. 4 is a diagram illustrating components used in a proximity warning system in accordance with a preferred embodiment of the present invention.

Turning now to FIG. 4, a diagram illustrating components used in providing a warning system is depicted in accordance with a preferred embodiment of the present invention. In these examples, zone 400 is a room with door 402 providing an entrance into zone 400. Work stations 404, 406, 408, 410, 412, and 414 are present in zone 400. Person 416 carries tag 418.

When person 416 enters zone 400, sensor 420 detects person 416 based on tag 418 carried by person 416. The particular type of sensor tag used may take various forms. For example, a tag containing electromagnetic, acustomagnetic, or radio frequency identification (RFID) technology may be incorporated into a badge carried by the guest or other personnel. With an RFID system, a circuit and an antennae are employed, in which sensor 420 may generate a signal. This signal causes the electric circuit in tag 418 to generate a response when the signal is received by sensor 420. This response may be merely a signal at a preselected frequency or may actually transmit data. The data may be, for example, a security level or an identification number used to identify the person. Further, paper badges may be enhanced with an appropriate circuit, such as a RFID circuit for use as a tag, such as tag 418.

This information received by sensor 410 is transmitted by sensor 420 to a mechanism, such as server 104 in FIG. 1, which then broadcasts a message to work stations 404, 406, 408, 410, 412, and 414 in zone 400. In addition, the sensors also may include motion detectors to detect movement in the areas being monitored. The motions sensors may be separate from these sensors. A detection of movement in a zone and an absence of an appropriate signal from a tag may indicate that a person is in the zone without a badge. This situation also causes security actions to be taken.

These data processing systems may then perform different security actions, depending on the particular implementation. The security actions are taken to protect data on the data processing systems in these examples. In one case, all of the data processing systems may take the same security action. For example, the display may be obscured, such as displaying a screen saver, displaying a log-in screen, fading to black, or minimizing all windows on the screen.

Additionally, another security action may involve obscuring elements on displays on the data processing systems, such as windows. For example, a screen saver may be displayed in a given window, which contains confidential or security restricted information, while other windows may remain displayed because no confidential or secret information is present in those windows. The window containing confidential or secret information also may be minimized, the window may fade to black or may be obscured, or a save and close command may be issued to that window.

In this type of security action, selecting which windows on which to perform security actions may be based on access control levels of information displayed in the windows. For example, if a time clock program is being executed, in most cases the access control level will not exceed a defined security level. As a result, in the window opened by a time clock program will not be affected by security actions.

Further, the security actions may be extended to include sub-objects. For example, a text editor or word processing program may be an object, while a file is a sub-object. A security level may be associated with the text editor program and a second security level may be associated with the file, the sub-object, being edited. The security level of the window is the greater of the two elements, the text editor program and the file. If the file contains confidential secret information, the security level of the display element is that of the file being edited.

Actions taken for different applications and for documents may be implemented using tags within documents. For example, a document in extensible mark-up language (XML) may contain security elements and identify a security level of a given component by the maximum security level of an element within a structure describing the component. A tag pair, for example, "<xsl:security level="8">, </xsl:security>" and has various XML statements located between these two tags. Additionally, security tags may be stored as an extended attribute of the object or sub-object, depending on the implementation.

This XML document may be executed or processed to identify security levels for components in a windowed system. In these examples, the document is executed by the client data processing system on which the security action is to be taken in response to receiving a message indicating the presence of a guest or person entering the zone. Alternatively, the extended attributes in a file system may be used to store security data, rather than employing an XML document.

In another example, zone 400 may be divided into two or more zones in which security actions are taken only when person 416 enters the other zone. For example, sensor 424 monitors zone 422, while sensor 430 monitors zone 428. No messages are broadcast until person 416 enters zone 424. At that time, messages are broadcast only to workstations 404, 406, and 408. When person 416 moves into zone 428, messages are broadcast only to work stations 410, 412, and 414. The work stations in zone 424 may return to normal operation when person 416 leaves zone 422 and enters zone 428 from zone 422. In this manner, zones may be set up for large areas without requiring security actions being taken on every data processing system when a person enters a large room.

Figure 5:
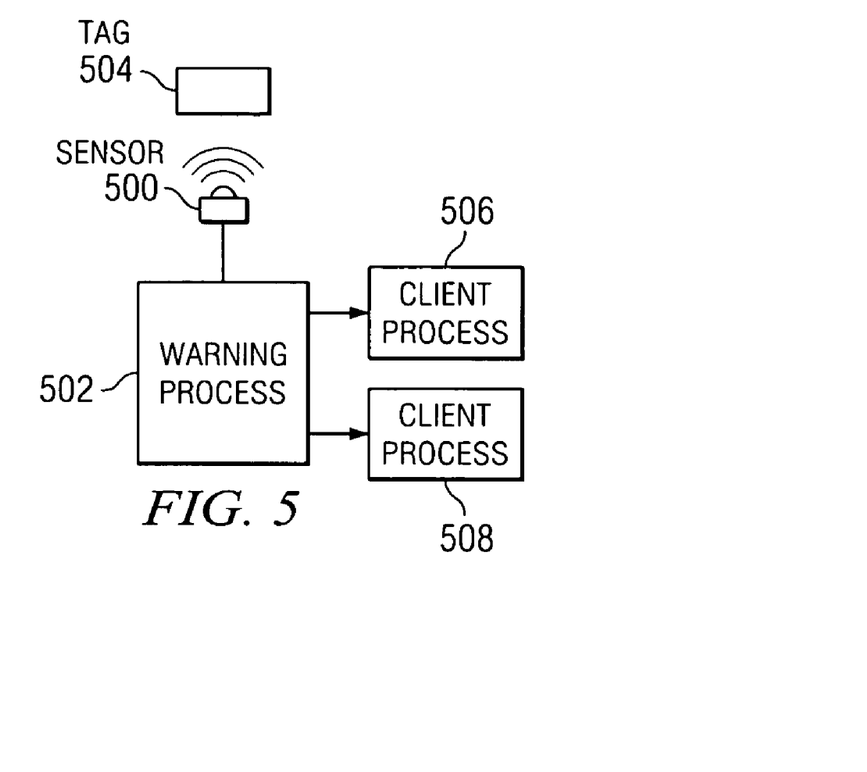
FIG. 5 is a diagram illustrating components used in detecting proximity of a person in a security zone in accordance with a preferred embodiment of the present invention.

Turning next to FIG. 5, a diagram illustrating components used in detecting proximity of a person in a security zone is depicted in accordance with a preferred embodiment of the present invention. These components include sensor 500 and warning process 502. Sensor 500 detects a presence of tag 504. In response, warning process 502 may send messages to client process 506 and client process 508 to initiate one or more security actions as described above.

Other processing may occur in warning processor 502, depending on the information received by warning process 502 by tag 504. If a security level is sent by tag 504, this information may be included in the message broadcast to client process 506 and client process 508. If the information received is an identification of the person, warning process 502 may use this identification to determine the security clearance that the person has by querying a database to obtain security clearance information on the person.

Warning process 502 may be implemented in server 104 in FIG. 1. Alternatively, this process may be implemented in a data processing system located in the zone, depending on the particular implementation. Tag 504 is incorporated into a badge worn by the person in these examples.

Client process 506 and client process 508 are processes that are initiated or respond to a message broadcast to them by warning process 502. This message may include merely an indication that an alert is present or may include other information in the message, such as a security level of the person. Also, if motion is detected using a motion sensor in the zone, but no signal from a tag is received, a message may be broadcast to indicate that a person is present in the zone who does not have a badge. Appropriate security actions to protect the data are then initiated.

Figure 6:
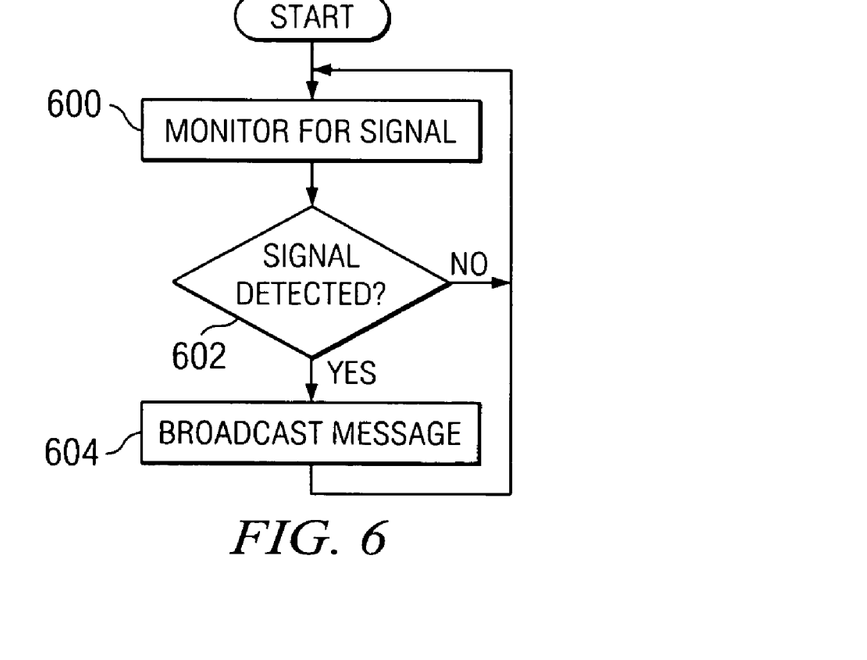
FIG. 6 is a flowchart of a process for monitoring for movement of a person into a zone in accordance with a preferred embodiment of the present invention.

Turning now to FIG. 6, a flowchart of a process for monitoring for movement of a person into a zone is depicted in accordance with a preferred embodiment of the present invention. The process illustrated in FIG. 6 may be implemented in a warning process, such as warning process 502 in FIG. 5.

The process begins by monitoring for a signal (step 600). In step 600, the process waits to receive a signal from a sensor, such as sensor 500 in FIG. 5. A determination is made as to whether a signal from a tag has been detected by the sensor (step 602). If a signal is not detected, the process returns to step 600. Otherwise, a message is broadcast to data processing systems associated with the zone being monitored (step 604), with the process then returning to step 600.

In this example, only the presence of a signal is monitored. No other data is used to generate an alert. The message is periodically broadcast as long as the signal is detected in the zone by the sensor. Data processing systems associated with the zones will continue to take security actions and will periodically determine whether messages continue to be received. When messages are no longer continue to be received after a selected period of time, the security actions may cease.

Figure 7:
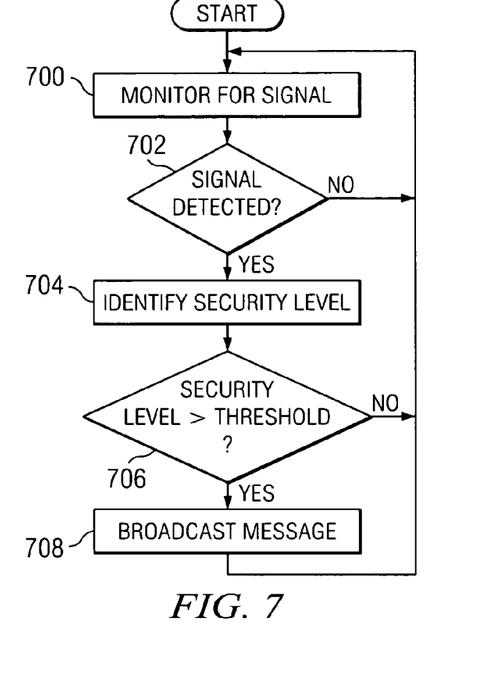
FIG. 7 is a flowchart of a process for monitoring for movement of a person into a zone in accordance with a preferred embodiment of the present invention.

In some cases, additional processing may occur with respect to detecting the signals. In this type of example, a security level for the person carrying the tag may be included in the signal generated by the tag. Turning now to FIG. 7, a flowchart of a process for monitoring for movement of a person into a zone is depicted in accordance with a preferred embodiment of the present invention. The process illustrated in FIG. 7 may be implemented in a warning process, such as warning process 502 in FIG. 5.

The process begins by monitoring for a signal (step 700). In step 700, the process waits to receive a signal detected by a sensor, such as sensor 500 in FIG. 5. A determination is made as to whether a signal has been detected by the sensor (step 702).

If a signal is not detected, the process returns to step 700. Otherwise, the security level transmitted with the signal is identified (step 704). A determination is then made as to whether the security level is more than a selected threshold level (step 706). If the security level of the person in the zone is greater than the selected threshold level, no message needs to be broadcast to the data processing systems in the zone. Alternatively, this step of comparing thresholds may be implemented at the data processing systems in the zone.

If the security level is more than the threshold, a message is broadcast (step 708) with the process returning to step 700 as described above. Turning back to step 702, if a signal is not detected the process also returns to step 700.

Figure 8:
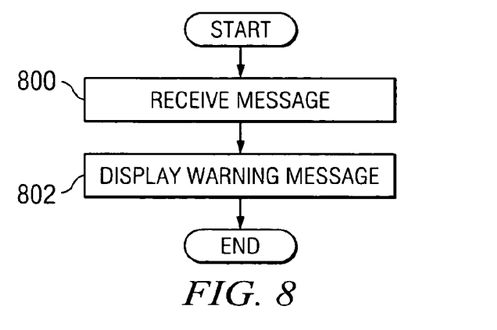
FIG. 8 is a flowchart of a process for processing a warning message in accordance with a preferred embodiment of the present invention.

With reference now to FIG. 8, a flowchart of a process for processing a warning message is depicted in accordance with a preferred embodiment of the present invention. The process illustrated in FIG. 8 may be implemented in data processing system in a zone, such as workstation 404 in FIG. 4.

The process begins by receiving a message (step 800). The message is received from a warning process, such as warning process 502 in FIG. 5. A warning message is displayed in the display of the data processing system (step 802), with the process terminating thereafter. This process is a simple illustration of a security action that is taken.

Figure 9:
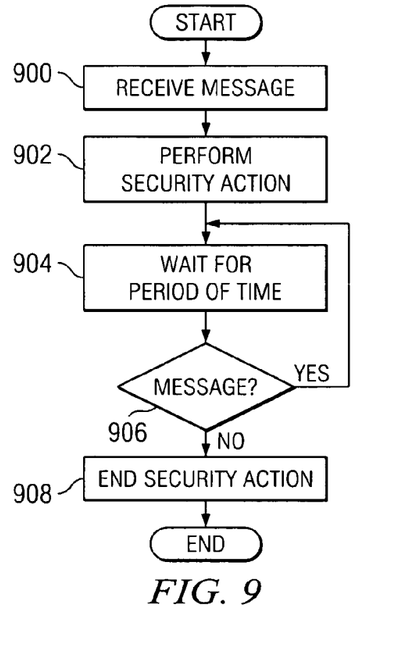
FIG. 9 is a flowchart of a process for processing a warning message in accordance with a preferred embodiment of the present invention.

With reference now to FIG. 9, a flowchart of a process for processing a warning message is depicted in accordance with a preferred embodiment of the present invention. The process illustrated in FIG. 9 may be implemented in data processing system in a zone, such as workstation 404 in FIG. 4.

The process begins by receiving a message (step 900). The message is received from a warning process, such as warning process 502 in FIG. 5. In response to receiving the message, a security action is performed (step 902). Many types of security actions may be performed from displaying a screen saver on the entire display to minimizing only windows having secret or confidential information. The process then waits for a period of time (step 904). Thereafter, a determination is made as to whether another message has been received (step 906). If another message has been received the process returns to step 904 as described above.

Otherwise, the security action is ended (step 908) with the process terminating thereafter. By monitoring for additional messages, the cessation of receiving messages is used to indicate that security actions no longer need to be taken. Alternatively, the present invention may monitor for an absence of messages if motion is detected in the area being monitored. Such a situation would indicate that a person is present without an appropriate badge.

Figure 10:
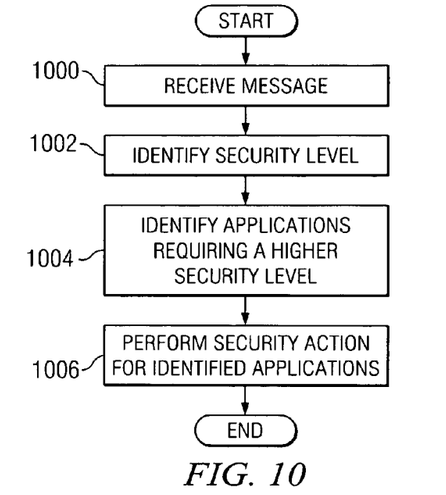
FIG. 10 is a flowchart of a process for processing a message indicating a presence of a person in a zone in accordance with a preferred embodiment of the present invention.

In FIG. 10, a flowchart of a process for processing a message indicating a presence of a person in a zone is depicted in accordance with a preferred embodiment of the present invention. The process illustrated in FIG. 10 may be implemented in data processing system in a zone, such as workstation 404 in FIG. 4.

The process begins by receiving a message (step 1000). The message is received from a security process, such as security process 502 in FIG. 5. A security level is identified from the message (step 1002). Thereafter, applications requiring a higher security level than that in the message are identified (step 1004). Security actions are performed for the identified applications (step 1006).

Figure 11:
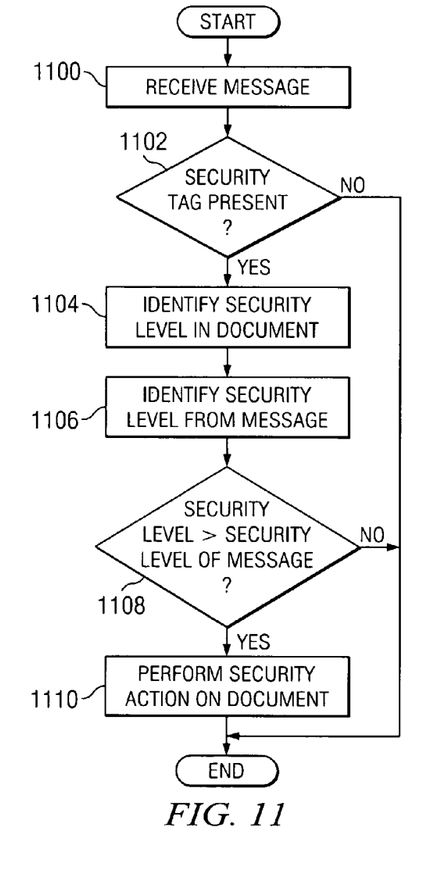
FIG. 11 is a flowchart of a process for identifying security actions for a document in accordance with a preferred embodiment of the present invention.

Next, FIG. 11 is a flowchart of a process for identifying security actions for a document in accordance with a preferred embodiment of the present invention. The process illustrated in FIG. 11 may be implemented in data processing system in a zone, such as workstation 404 in FIG. 4.

The process begins by receiving a message from a security process (step 1100). In these examples, the tags in the documents are pre-parsed when the document is first loaded onto a data processing system. With the pre-parsed tags, a determination is made as to whether security tags are present in the document (step 1102). If security tags are found in the document, a security level is identified for the document using the identified security tags (step 1104). A security level is identified from the message (step 1106).

Next, a determination is made as to whether the security level of the document is greater than the security level of the message (step 1108). If the security level of the document is greater than the security level of the message, a security action is performed for the document (step 1110), with the process terminating thereafter.

With reference again to step 1108, if the security level of the document is not greater than the security level of the message, the process terminates. The process also terminates in step 1102 if security tags are not found in the document. Although the tags are pre-parsed in this example, the tags could be parsed when the alert is received depending on the particular implementation.

This process may be used to identify security levels for different objects, including objects and sub-objects. The process may be used to identify security levels for objects upon object execution and loading of sub-objects associated with object execution. In this manner, security levels for windows being displayed may be identified as a maximum of the identified security levels for the object.

Figure 12:
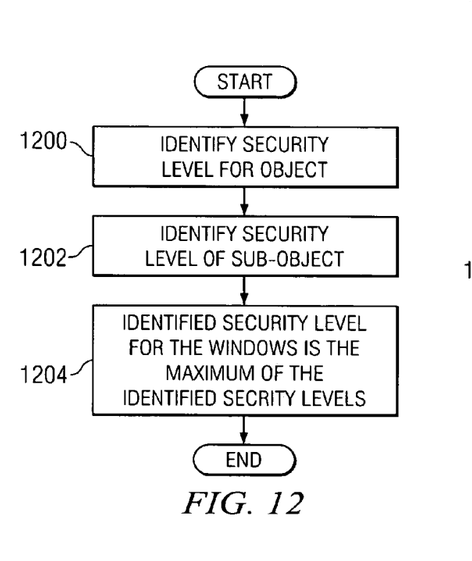
FIG. 12 is a flowchart of a process for identifying security levels for objects and sub-objects in accordance with a preferred embodiment of the present invention.

Turning now to FIG. 12, a flowchart of a process for identifying security levels for objects and sub-objects is depicted in accordance with a preferred embodiment of the present invention. The process illustrated in FIG. 12 may be implemented in data processing system in a zone, such as workstation 404 in FIG. 4.

The process is initiated upon object execution and sub-object load in this example. The process begins by identifying a security level for the object (step 1200). Thereafter, the security level of any sub-objects is identified (step 1202).

Thereafter, the identified security level for the window is a maximum of the identified security levels (step 1204) with the process terminating thereafter. The security actions may be performed on a window level or the security level for all the windows may be aggregated to identify the security level for the entire system.

Figure 13:
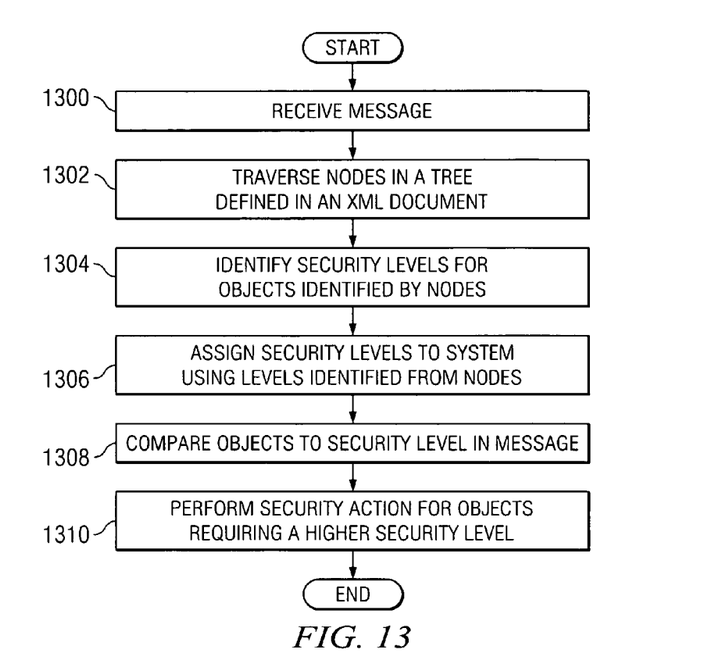
FIG. 13 is a flowchart of a process for identifying security actions based on a document in accordance with a preferred embodiment of the present invention.

Next, FIG. 13 is a flowchart of a process for identifying security actions for an entire data processing system depicted in accordance with a preferred embodiment of the present invention. The process illustrated in FIG. 13 may be implemented in data processing system in a zone, such as workstation 404 in FIG. 4.

The process begins by receiving a message from a security process (step 1300). Thereafter, a document is parsed for security tags (step 1302). Security levels are identified for objects by nodes associated with the security tags (step 1304). The security levels are assigned to objects in the data processing system using the security levels identified in the nodes (step 1306). Thereafter, a comparison of the security levels objects in the data processing system is made with the security level in the message (step 1308), and security actions are performed for objects having a higher security level than the security level in the message (step 1310), with the process terminating thereafter.

In step 1308, the security actions may be implemented on a per object basis or a system level. With this process, the security level may be compared on a per object basis or a system level basis depending on the particular implementation.

In the example in FIG. 13, the document may be an XML document containing security tags as described above. The document is parsed to identify security levels for different objects and the security values are imputed or assigned to the objects in a manner allow for appropriate security actions to be taken by the data processing system. These objects may be, for example, programs, files, and windows. The XML document allows for flexibility in changing or adding objects as well as the security level that is to be associated with the objects.

Figure 14:
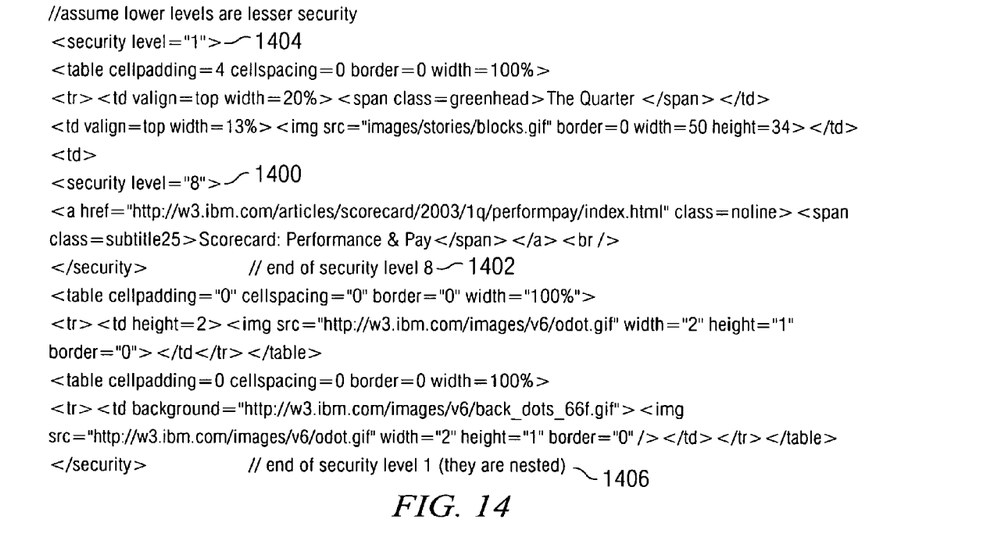
FIG. 14 is a diagram illustrating a document containing security tags in accordance with a preferred embodiment of the present invention.

FIG. 14 is a diagram illustrating a document containing security tags in accordance with a preferred embodiment of the present invention. In this example, the document contains security tags 1400 and 1402, which are a pair of tags defining the security level of objects identified between those tags as being security level 8. The pair of tags formed by tags 1404 and 1406 define the security level of the entire documents as being security level 1. Tags 1400 and 1402 are nested within tags 1404 and 1406 in this example.

Thus, the present invention provides an improved method, apparatus, and computer instructions for generating alerts and initiating security actions in a zone or area that is to be secured. A presence of a person in a zone is detected via a tag carried by the person. When a person is detected, messages are sent to data processing systems in the zone to initiate security actions without require manual or human intervention to protect secret or confidential information.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for warning of a presence of a person in a zone having an inadequate security clearance, the computer implemented method comprising:

receiving a message by a selected data processing system within a plurality of data processing systems located within the zone, wherein the message comprises a security level associated with a person detected entering the zone;

initiating security actions to protect data displayed on the selected data processing system, wherein initiating the security actions further comprises:

identifying a security level of each window in a plurality of windows displayed at the selected data processing system;

selecting at least one window in the plurality of windows on which to perform the security actions to form selected windows, wherein a window in the plurality of windows is selected to form the selected windows if a security level of the window is greater than the security level associated with the person; and performing the security actions to protect the data displayed on the selected windows while data displayed in other windows in the plurality of windows remain displayed, wherein the security actions are performed depending on a confidentiality level of the data being displayed at the data processing system; and monitoring for additional messages indicating a presence of an unauthorized person in the zone, wherein cessation of receiving messages indicates that the security actions no longer need to be taken.

2. The computer implemented method of claim 1, wherein the security actions further comprises:

minimizing the selected windows while other windows in the plurality of windows remain displayed.

3. The computer implemented method of claim 1, further comprising:

responsive to receiving the message, identifying the security level associated with the person from the message;

identifying applications executed on the selected data processing system requiring a higher security level than the security level associated with the person from the message to form identified applications; and performing the security actions for the identified applications.

4. The computer implemented method of claim 1, wherein the zone is selected from a room, a building, or a portion of a room.

5. The computer implemented method of claim 1, further comprising:
  responsive to receiving the message, identifying a security level of the message; and
  performing a security action to protect data displayed on the selected data processing system, based on the security level of the message.

6. The computer implemented method of claim 5, further comprising:
  responsive to determining that security tags are present in a document displayed on the selected data processing system, identifying a security level of the document based on the security tags; and
  responsive to a determination that the security level of the document is greater than the security level of the message, performing a security action on the document.

7. The computer implemented method of claim 6, wherein the selected data processing system parses the document containing the security tags to identify the security actions to be performed.

* * * * *